US011252255B2

(12) United States Patent
Davis et al.

(10) Patent No.: US 11,252,255 B2
(45) Date of Patent: Feb. 15, 2022

(54) DATA AGGREGATION VIA AN EDGE COMPUTING SYSTEM

(71) Applicant: Bank of America Corporation, Charlotte, NC (US)

(72) Inventors: Ryan Davis, Charlotte, NC (US); Crystal M. Sundaramoorthy, Charlotte, NC (US); Kevin A. Delson, Woodland Hills, CA (US); Brandon Sloane, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/448,081

(22) Filed: Jun. 21, 2019

(65) Prior Publication Data
US 2020/0404063 A1 Dec. 24, 2020

(51) Int. Cl.
*H04L 29/08* (2006.01)
(52) U.S. Cl.
CPC .......... *H04L 67/288* (2013.01); *H04L 67/289* (2013.01); *H04L 67/303* (2013.01); *H04L 67/327* (2013.01)
(58) Field of Classification Search
CPC ... H04L 67/288; H04L 67/289; H04L 67/303; H04L 67/327
See application file for complete search history.

(56) References Cited

U.S. PATENT DOCUMENTS

| 8,243,596 | B2 | 8/2012 | Fedders et al. |
| 8,244,874 | B1 | 8/2012 | Thireault |
| 9,297,723 | B1 * | 3/2016 | Hofmann .............. G06N 20/00 |
| 9,516,620 | B1 * | 12/2016 | Upp .................... H04L 65/1016 |
| 9,900,725 | B2 | 2/2018 | Young et al. |
| 2009/0286484 | A1 * | 11/2009 | Phung ................ H04L 41/0856 455/67.11 |

(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.

(Continued)

*Primary Examiner* — William G Trost, IV
*Assistant Examiner* — Abdelbasst Talioua
(74) *Attorney, Agent, or Firm* — Weiss & Arons LLP

(57) ABSTRACT

A method for aggregating outage data via an edge computing system is provided. The method may include transmitting, by each edge-node included in a network, a self-identifying, self-locating, communication. The method may include receiving, at each edge-node included in the network, self-identifying, self-locating, communications from one or more edge-nodes included in the network. The method may include detecting an outage relating to a first edge-node included in the network. The outage may be detected by at least one edge-node included in the network. The at least one edge-node may not be the first edge-node. The at least one edge-node may be the first edge-node operating in limited capacity. The method may include identifying a most-recently confirmed location of an entity co-located with the first edge-node. The method may include dispatching outage-restoration-assistance to the most-recently confirmed real-time location of the entity co-located with the first edge-node.

17 Claims, 8 Drawing Sheets

(56) References Cited

U.S. PATENT DOCUMENTS

| | | | | |
|---|---|---|---|---|
| 2011/0200052 A1* | 8/2011 | Mungo | ................ | H04L 41/028 370/401 |
| 2012/0009904 A1* | 1/2012 | Modi | ................... | H04W 4/029 455/413 |
| 2013/0103946 A1* | 4/2013 | Binenstock | ......... | H04L 63/0492 713/168 |
| 2014/0379895 A1* | 12/2014 | Jain | ........................ | H04L 69/40 709/224 |
| 2015/0324247 A1* | 11/2015 | Hoshi | ................... | H04L 41/069 714/57 |
| 2016/0013990 A1* | 1/2016 | Kulkarni | .............. | H04L 41/065 709/224 |
| 2017/0195891 A1* | 7/2017 | Smith | ................... | H04M 15/60 |
| 2018/0121891 A1 | 5/2018 | Hosny et al. | | |
| 2018/0167445 A1 | 6/2018 | Speight et al. | | |
| 2018/0367314 A1 | 12/2018 | Egner et al. | | |
| 2019/0026450 A1 | 1/2019 | Egner et al. | | |
| 2019/0171510 A1* | 6/2019 | Smith | ..................... | H04L 43/04 |
| 2019/0293433 A1* | 9/2019 | Orsini | ................... | H04W 4/023 |
| 2019/0325865 A1* | 10/2019 | Oktem | .................... | G10L 13/00 |
| 2019/0349426 A1* | 11/2019 | Smith | ..................... | H04W 4/70 |
| 2019/0349737 A1* | 11/2019 | Lee | ..................... | H04W 74/085 |
| 2020/0064797 A1* | 2/2020 | Hannon | ............. | G05B 19/0421 |
| 2020/0128502 A1* | 4/2020 | Alexander | ............ | G06Q 50/06 |
| 2020/0195495 A1* | 6/2020 | Parker | ............... | H04M 15/8038 |

OTHER PUBLICATIONS

Paul Miller, "What is Edge Computing?" https://www.theverge.com/circuitbreaker/2018/5/7/17327584/edge-computing-cloud-google, May 7, 2018.

"What is Edge Computing," https://www.ge.com/digital/blog/what-edge-computing, GE Digital, Retrieved on May 16, 2019.

* cited by examiner

DATA AGGREGATION VIA AN EDGE COMPUTING SYSTEM

FIELD OF TECHNOLOGY

This disclosure relates to edge computing. Specifically, this disclosure relates to data aggregation using edge computing.

BACKGROUND OF THE DISCLOSURE

Conventionally, entities process and store their entity data in a central location, colloquially known at the "cloud." The cloud is typically at a location different from the entity. The cloud also stores multiple entities' data. The cloud has great processing capabilities and large amounts of available, relatively inexpensive, data storage.

Entities typically process their data stored on the cloud, and access their data stored on the cloud, via the internet. Because cloud computing combined large amounts of data from various entities, and enables the entities to utilize shared, state-of-the-art resources, cloud computing reduces the cost of data processing and storage. Cloud computing also removes any difficulties associated with maintaining data processing and storage systems.

There are limitations associated with cloud computing. Because entity data is processed and stored in a location different from the entity, and multiple entities utilize shared resources, there may be multiple entities that require data processing simultaneously. Therefore, at times, an entity may be obliged to wait for data processing until another entity's data is processed. Another limitation is that, when a device goes offline, the device is unable to access the stored data.

Recently, the processing capabilities of devices, such as mobile devices, tablets, smart watches, personal computers, servers and internet of things ("IoT") devices have been increasing. Therefore, it may be desirable to harness the computing power, processing power and storage of each device. It may be further desirable to process data and store data on each device, while maintaining communication between the device and a cloud. It should be appreciated that processing data on each device may reduce wait times in data processing. It should be further appreciated that storing data on each device may enable substantially continuous access to the data.

It may be further desirable for each device to communicate with each other, and be connected, via a network. In addition to utilizing the processing power of the edge devices, it would be also desirable to increase the efficiency of the edge devices, and reduce outage time associated with edge communications.

SUMMARY OF THE DISCLOSURE

An edge computing system for aggregating data is provided. The edge computing system may aggregate data from multiple edge-nodes within a network. An edge-node may be a node on the periphery or edge of a network. The network may include a plurality of edge-nodes. The edge-nodes included in the network may be located in different locations.

In some embodiments, the distance between any two edge-nodes may not be less than a predetermined distance. The predetermined distance may be fifty feet, one hundred feet or any other suitable distance. In the event that two edge-nodes are closer than the predetermined distance, the two edge-nodes may be considered to be one joined edge-node.

In some embodiments, the distance between any two edge-nodes may not be more than a predetermined distance. The predetermined distance may be fifty feet, five hundred feet or any other suitable distance. In the event that the distance between two edge-nodes is greater than the predetermined distance, the two edge-nodes may not be able to be linked within the network. It should be appreciated that the distance between one node included on one end of the network and another node included on another end of the network may be greater that the predetermined distance. This may be made possible because there may be additional nodes within the network. These additional nodes may ensure that the distance between each node and at least one other node is not greater than the predetermined distance.

An edge-node may be a computing device. Examples of edge nodes may include tablets, personal computers, mobile devices, smart watches, IoT devices and any other suitable computing device.

Each edge-node may include processing capabilities, memory storage, a display, and other suitable computing components. Each edge-node may include various software components. Such software components may include an operating system, software applications, stored data and any other suitable software components.

The stored data may include self-identifying data. Such self-identifying data may include a type of device, a name of an owner of the device, a street address of an owner associated with the device, a name of an entity co-located with the device, a street address of an entity co-located with the device, a telephone number associated with the device, an internet protocol ("IP") address associated with the device and other suitable self-identifying data.

Each edge-node may include a global positioning system ("GPS") application. The GPS application may identify the real-time location of the edge-node. The GPS application may utilize communications with a wireless network or satellite to identify the real-time location. The GPS application may utilize other methods for identifying the real-time location.

Each edge-node may determine a public profile for itself. The public profile may include identification data relating to an entity co-located with the edge-node. The public profile may include any suitable identification data. The public profile may be set by an entity associated with the edge-node. The public profile may include any data included by the entity associated with the edge nodes. The public profile may be adjustable at any time. The public profile may include a real-time location of the edge-node. The real-time location of the edge-node may be updated at set intervals by the GPS application.

Each edge-node may include a communication module. The communication module may communicate a self-identifying, self-locating, communication to the other edge-nodes included in the network. The self-identifying, self-locating, communication may include the public profile. The communication module of each edge-node may be configured to re-transmit a beacon of its public profile on a predetermined schedule. Other edge-nodes in the network may be configured to continuously seek beacons that have been transmitted from other edge nodes. The other edge-nodes in the network may store all beacons that have been discovered.

The beacon may be transmitted via wired or wireless technology, such as Bluetooth® communications, WIFI communications, radio frequency communications, satellite communications, Beacon® communications, internet communications, LORA WAN (wide area network)® communications and any other suitable communications. LORA WAN® communications may be a low-energy, long range, communication protocol. LORA WAN® communications can be updated at a low cycle rate, such as every two hours.

Because the edge-nodes are in continuous, or periodic, communication with each other, when an edge-node included in the public profile undergoes an outage, the other edge-nodes may detect the outage. The outage may be detected because a first edge-node detects that a beacon transmission has not been received from a second edge-node within a predetermined amount of time. The outage may also be detected because a first edge-node may attempt to communicate with a second edge-node, and the second edge-node may be unresponsive. The outage may also be detected because a third edge-node may transmit an outage message to the first edge-node. The outage message may state that the second edge-node is experiencing an outage. The outage may also be detected because the first edge-node may transmit a distress beacon. The distress beacon may state that the first edge-node is experiencing an outage.

It should be appreciated that, when a device is turned OFF it may not be determined to be unresponsive. This may be because the device may transmit a "OFF" beacon prior to shutting down.

Upon determination that the second-edge node is experiencing an outage, the first edge-node may identify a stored, most-recent, real-time, location of the first edge-node. The stored, most-recent, real-time, location of the first edge-node may be based on a most-recently received public profile from the first edge node.

Upon identification of the stored, most-recent, real-time location, of the first edge node, the edge-nodes that identified that outage and the location may transmit an outage message to an edge-node suitable to provide outage-restoration-assistance. The outage message may include the stored, most-recent, real-time, location. The outage message may include the public profile of the edge-node that incurred an outage. The outage node may be transmitted to the edge-node suitable to provide assistance via one or more edge-nodes on the network.

One or more outage messages may be received at the edge-node suitable to provide outage-restoration-assistance. The edge-node suitable to provide outage-restoration-assistance may aggregate data from the received outage messages. The aggregated data may include locations that experienced outages. The outages may be caused by natural disasters, such as hurricanes, floods or tornadoes. The outages may also be caused by power outages or electrical outages. The second edge-node may dispatch outage-restoration assistance to entity associated with the first edge-node. The entity associated with the edge-node suitable to provide outage-restoration-assistance may be a first responder.

In some embodiments, when two or more edge-nodes include a public profile that identifies the same entity, and the current location of the two or more edge-nodes is within a predetermined distance, the two or more edge-nodes may be identified as a single joint edge-node. This embodiment may prevent one entity, that is identified by multiple devices, from being misconstrued as multiple entities.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1A:
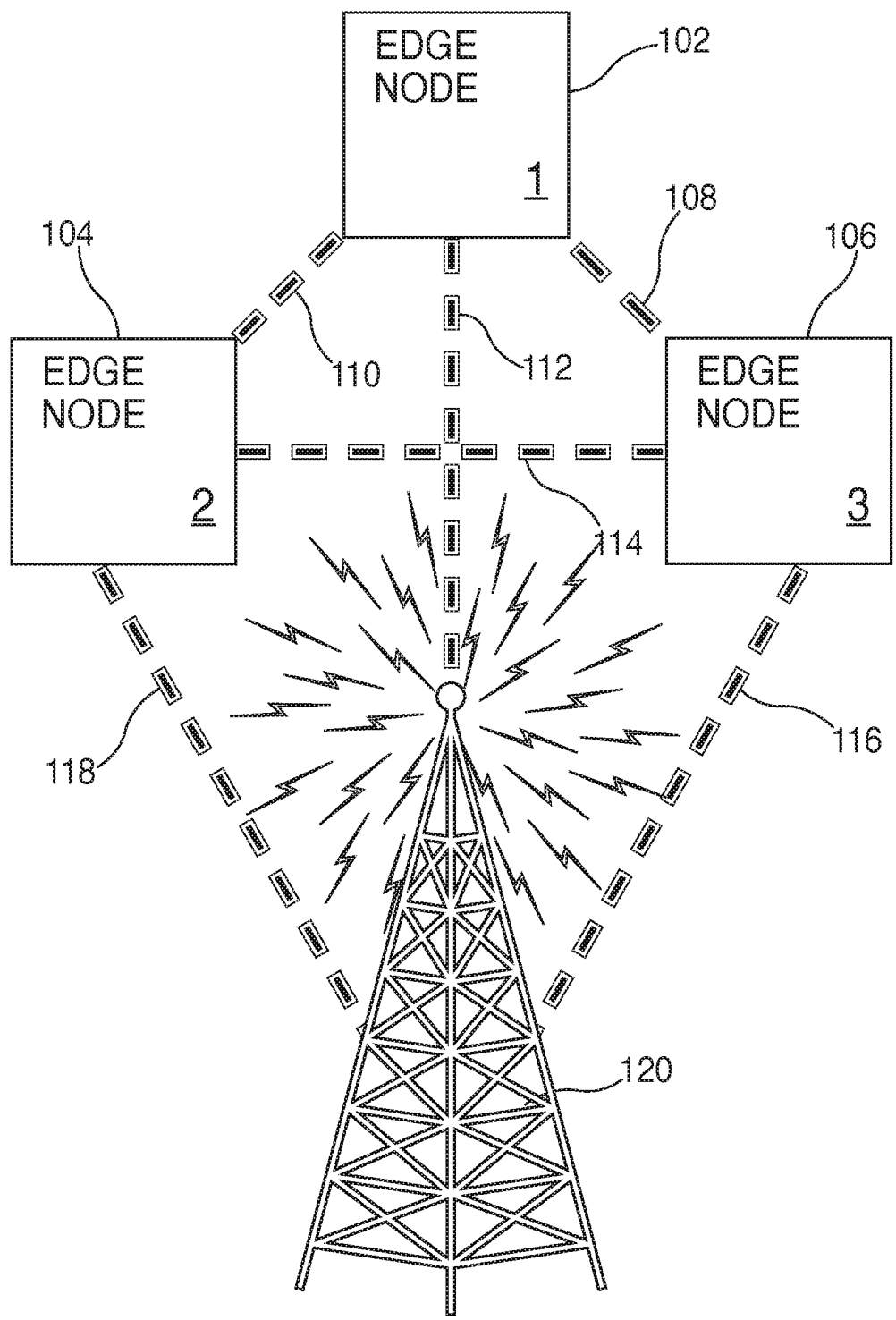
FIGS. 1A, 1B, 1C and 1D show illustrative diagrams in accordance with principles of the invention.

Systems and methods for aggregating outage data via an edge computing system is provided. The outage data may be aggregated before, during and/or after the outage. The method, according to certain embodiments, may cause an edge-node on a network transmitting a self-identifying, self-locating, communication to other edge-nodes on the network.

The communication may include a public profile. The public profile may include identification data relating to an entity co-located with the edge-node. The public profile may also include a real-time location of the edge-node.

The method may include receiving self-identifying, self-locating, communications from the other edge-nodes in the network. One or more edge-nodes and/or all the edge-nodes may receive the communications. At times, receipt of the communications may be limited to edge-nodes within a predetermined radius.

The method may include detecting an outage on a first edge-node. The outage may be detected by one or more of the remaining edge-nodes. The outage may be detected because of un-responsiveness of the first edge node.

The method may include identifying the most-recently communicated, real-time, location of the entity co-located with the first edge-node. The identified location may be based on the most-recently communicated public profile of the first edge-node.

The method may include transmitting an outage message to a second edge-node. The transmission may be from an edge-node that determined the outage of the first edge-node. In some embodiments, the outage message may be transmitted to the second edge-node via one or more other edge-nodes. The second edge-node may be configured to, or operable to, provide outage-restoration-assistance to the entity co-located with the first edge-node.

In some embodiments, where the first edge-node has limited receiving capabilities, the second edge-node may generate a self-healing work load. The self-healing work load may be packaged and transmitted to the first edge-node. The first edge-node may deploy the self-healing work load. Upon deployment of the self-healing work load, the first edge-node may become partially or completely operable.

In other embodiments, the second edge-node may generate a file or script for repair of the first edge-node. The file or script may be stored on a universal serial bus ("USB") drive. The USB drive may be physically transmitted to the first edge-node. The USB drive may be attached to the first edge-node. The file or script may be transferred from the USB drive to the first edge-node. The file or script may be deployed on the first edge-node. Upon deployment of the file or script, the first edge-node may be partially or completely operable.

The second edge-node may aggregate a plurality of received outage messages. The second edge-node may generate an organized list of received outage messages. The second edge-node may present the organized list of received outage message to an entity associated with the second edge node. In some embodiments, the organized list may be a heat map. The heat map may show multiple outages on a map.

In some embodiments, an authoritative aggregator and/or filtering agent may receive the organized list. The authoritative aggregator and/or filtering agent may review the list, make changes to the list, re-arrange the priority of various outages on the list, remove outages that were incorrectly identified as outages from the list, combine multiple instances of a single outage on the list and perform other suitable actions. The authoritative aggregator and/or filtering agent may transmit the updated list to an entity associated with the second edge-node. In this embodiment, the outage message may be first transmitted to the authoritative aggregator, and then transmitted from the authoritative aggregator to an entity associated with the second edge-node. The entity associated with the second edge-node may be a first responder.

The method may be configured to dispatch outage-restoration-assistance to the most-recently identified, real-time location of the entity co-located with the first edge-node.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1A shows an illustrative diagram. Edge-node 1, shown at 102, edge-node 2, shown at 104, edge-node 3, shown at 106, and central server node 120 may be included in an illustrative network. Edge-node 1 may be in communication with edge-node 2 via communication line 110. Edge-node 1 may be in communication with edge-node 3 via communication line 108. Edge-node 1 may be in communication with central server node 120 via communication line 112.

Edge-node 2 may be in communication with edge-node 3 via communication line 114. Edge-node 2 may be in communication with central server node 120 via communication line 118. Edge-node 3 may be in communication with central server node 120 via communication line 116.

In some embodiments, an edge-node may transmit a "discover" communication. The discover communication may seek or discover nodes in a predetermined vicinity of the transmitting node. Upon discovery of a node in the predetermined vicinity, the transmitting node may identify the discovered node.

The discover communication may also identify itself to all identified edge-nodes in the predetermined vicinity of the transmitting node. The predetermined vicinity may be an amount of feet, yards or miles. The predetermined vicinity may be a specific property. The predetermined vicinity may be a town, city, state, province, country or continent. The predetermined vicinity may be any suitable area or region.

In some embodiments, the discover communication may include a self-identifying, self-locating, communication. In other embodiments, the self-identifying, self-locating, communication may be transmitted absent the discover communication. The discover communication and/or the self-identifying, self-locating, communication may be implemented using WIFI technology, Bluetooth® technology, internet technology, LORA WAN technology and/or any other suitable communication technology.

The self-identifying, self-locating, communication may include a public profile. A public profile may be a profile which is available publicly to any other node. Such a public profile may include data relating to the edge-node. The public profile may include identification data relating to the edge-node and/or an entity associated with, or co-located with, the edge-node. Such identification data may identify a person associated with, or co-located with, the edge-node. The identification data may include a name, telephone number, contact data and/or any other suitable identification data. The public profile may include a location of the edge-node. The location may be transmitted in various formats, such as global positioning system ("GPS") coordinates, a street address or any other suitable location format.

Because the data included in the public profile, specifically the location data, may change frequently, the self-identifying, self-locating, communication may be re-transmitted on a predetermined schedule. The transmission of the self-identifying, self-locating, communication may be a beacon transmission. In some embodiments, the rate of location change with respect to the initial starting point is greater than a predetermined amount of change. In such embodiments, the frequency of the rate of beacon transmission may be proportional to the rate of location change with respect to the initial starting point.

Figure 1B:
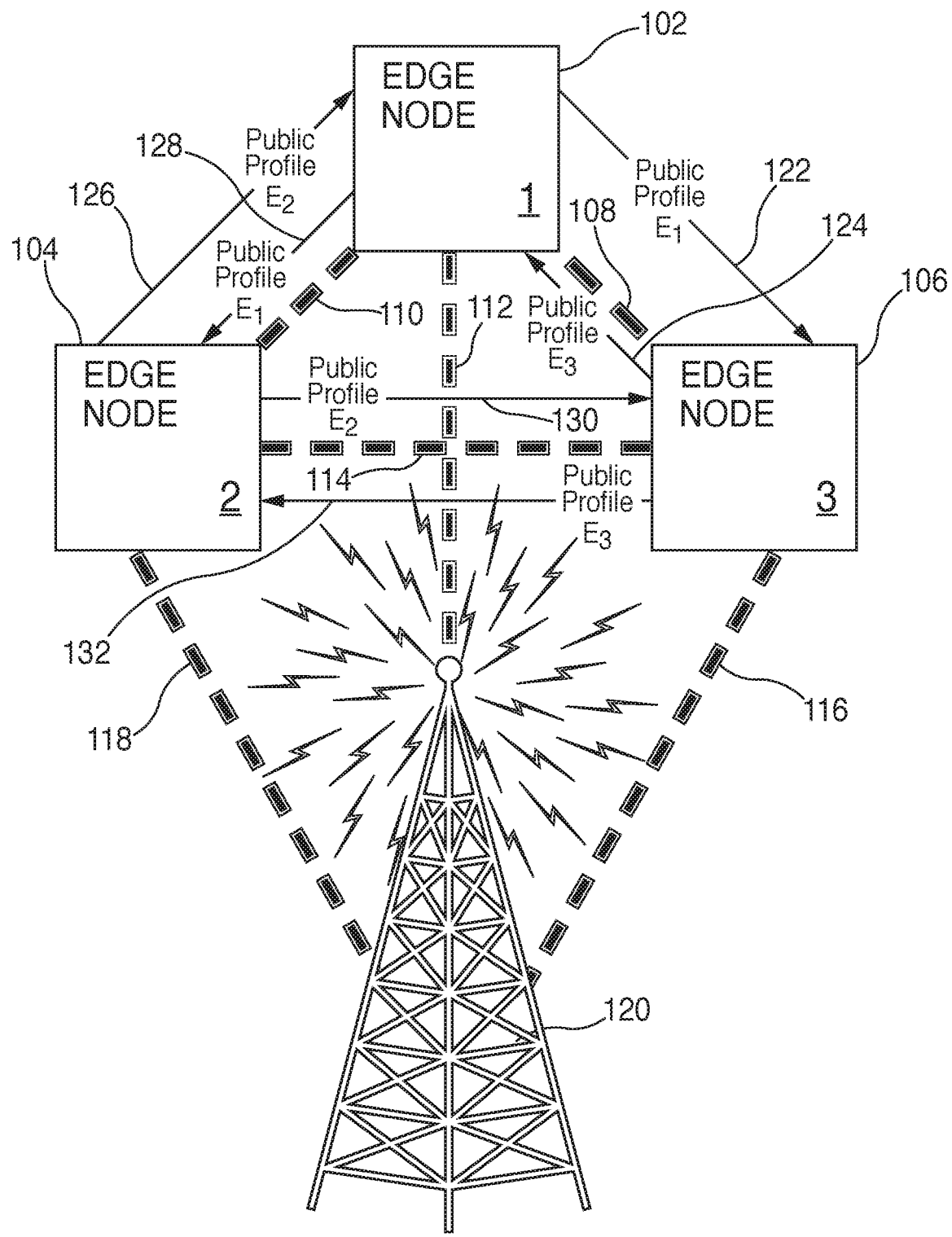

FIG. 1B shows the network shown in FIG. 1A. Edge-node 1 may communicate its own public profile to edge node 2, as shown at 128. Edge-node 1 may communicate its own public profile to edge node 3, as shown at 122.

Edge-node 2 may communicate its own public profile to edge node 1, as shown at 126. Edge-node 2 may communicate its own public profile to edge node 3, as shown at 130.

Edge-node 3 may communicate its own public profile to edge node 1, as shown at 124. Edge-node 3 may communicate its own public profile to edge node 2, as shown at 132.

It should be appreciated that the communications shown in FIG. 1B may be continual communications. The communications shown in FIG. 1B may be re-transmitted after a predetermined amount of time has elapsed.

Figure 1C:
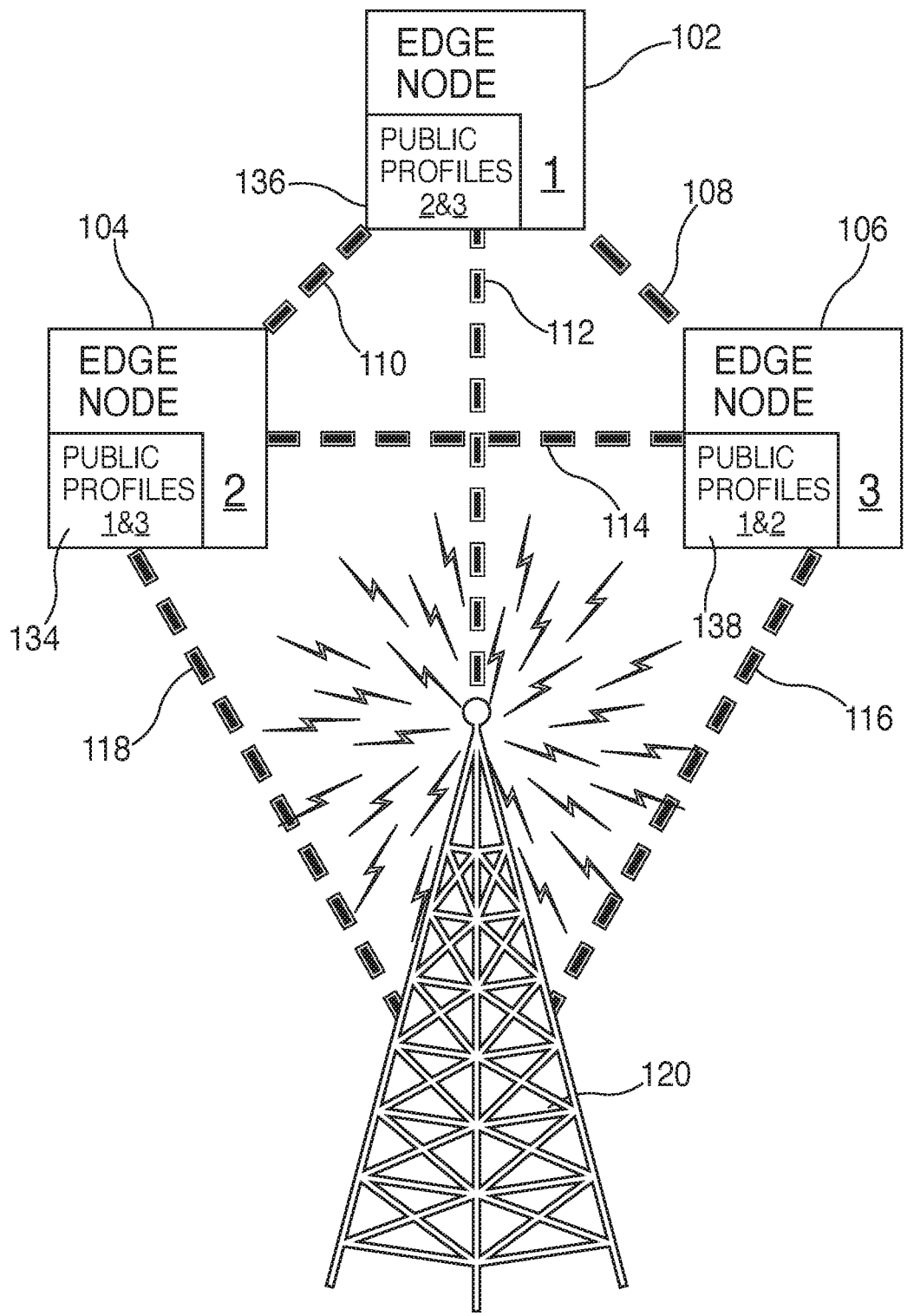

FIG. 1C shows the network shown in FIG. 1A. In FIG. 1C, edge node 1 may include the most-recently transmitted public profiles of edge nodes 2 and 3, as shown at 136. Edge node 2 may include the most-recently transmitted public profiles of edge nodes 1 and 3, as shown at 134. Edge node 3 may include the most-recently transmitted public profiles of edge nodes 1 and 2, as shown at 138.

Figure 1D:
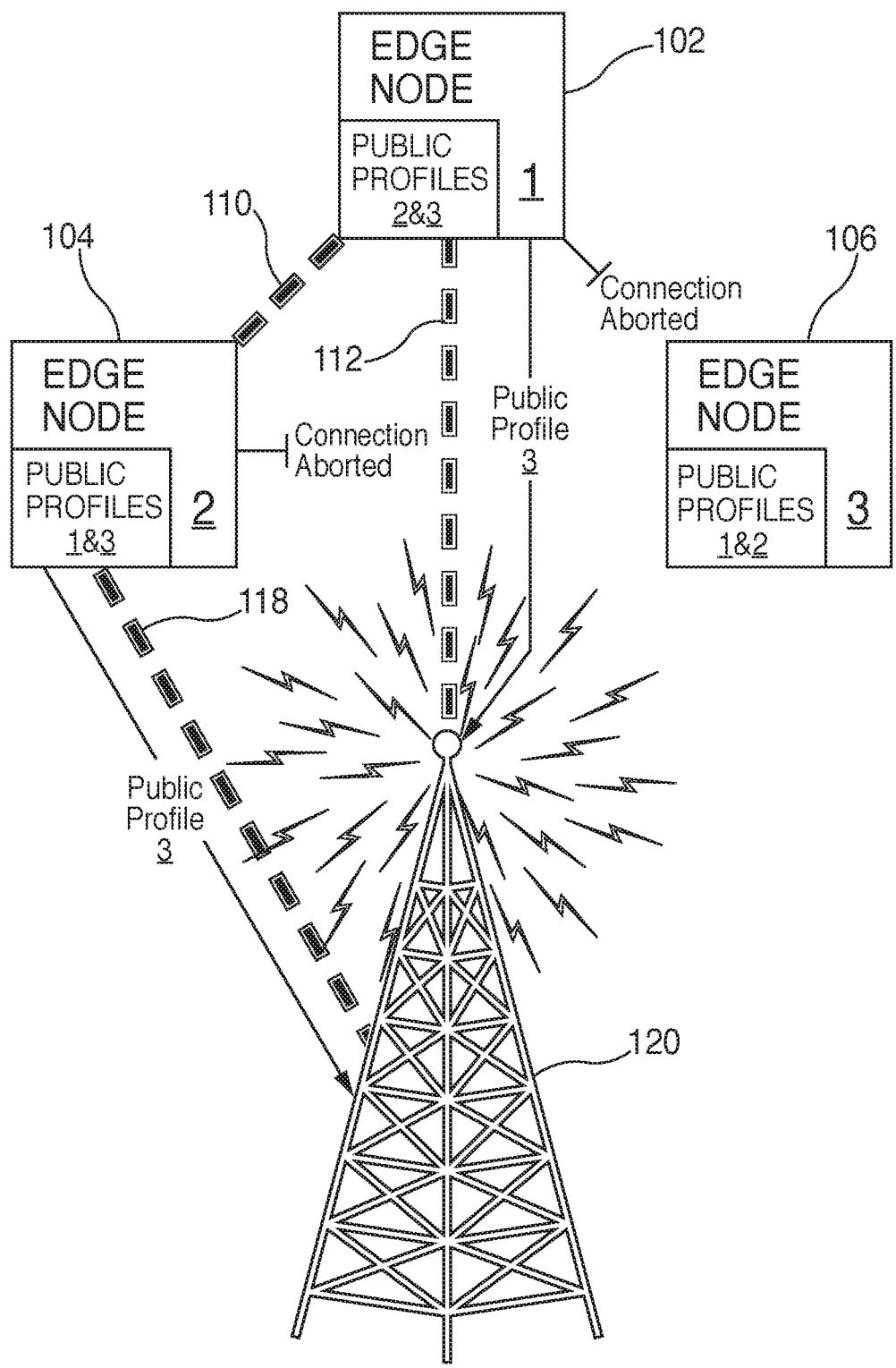

FIG. 1D shows the network shown in FIG. 1A. In FIG. 1D, the connection between edge node 1 and edge node 3 has been aborted. The connection may have been aborted for a variety of reasons. Such reasons may include a natural disaster, a technical outage or any other suitable reason. Edge node 1 may determine that an outage has occurred to edge node 3. Edge node 1 may transmit the most recent public profile of edge node 3 to server node 120. Server node may be an edge-node that is capable of dispatching outage-restoration-assistance to edge node 3.

The connection between edge node 2 and edge node 3 has been aborted. The connection may have been aborted for a variety of reasons. Such reasons may include a natural disaster, a technical outage or any other suitable reason. Edge node 2 may determine that an outage has occurred to edge node 3. Edge node 2 may transmit the most recent public profile of edge node 3 to server node 120. Server node may be an edge-node that is capable of dispatching outage-restoration-assistance to edge node 3.

Figure 2A:
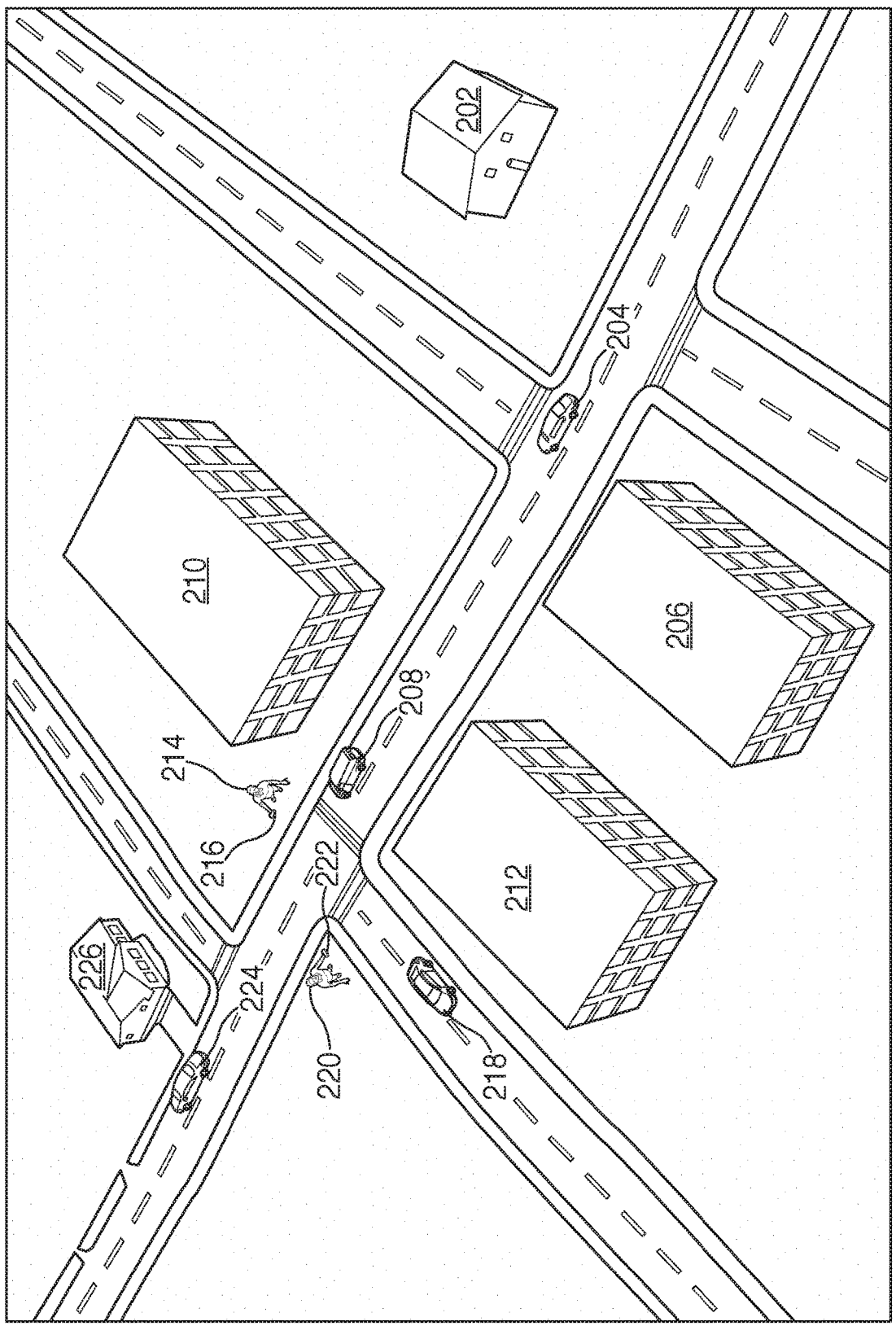
FIGS. 2A and 2B show illustrative diagrams in accordance with principles of the invention.

FIG. 2A shows an illustrative network. The illustrative network may include a variety of nodes. The nodes may include a plurality of vehicles. The plurality of vehicles may include car 204, truck 208, car 218, and car 224. The public profile associated with these vehicles may include a model of a car, an amount of people or animals currently utilizing the car, the names of the people currently in the car, the speed at which the car is traveling and any other suitable vehicle data.

The nodes may include a plurality of houses. The plurality of house may include house 202 and house 226. The public profile associated with these houses may be the amount of people in the house, the names of the people currently in the house, the size of the house, the amount of rooms in the house, the architectural plans associated with the house and/or any other suitable data.

The nodes may include a plurality of buildings. The plurality of buildings may include building 206, building 210 and building 212. The public profile associated with these buildings may include the names of the people included in the building, the companies that utilize the building, the amount of people currently in the building, the size of the building, the amount of rooms included in the building, the architectural plans associated with the building and any other suitable data.

The nodes may include mobile devices 216 and 222. Mobile device 216 may be associated with person 214. The public profile associated with mobile device 216 may include personal data relating to person 214. The personal data may include whether person 214 is stationary or moving, and if person 214 is moving, a direction in which person 214 is moving. The personal data may also include the speed at which person 220 is moving.

Mobile device 222 may be associated with person 220. The public profile associated with mobile device 222 may include personal data relating to person 222. The personal data may include whether person 220 is stationary or moving, and if person 220 is moving, a direction in which person 220 is moving. The personal data may also include the speed at which person 220 is moving.

It should be appreciated that each of the nodes described above may communicate with one another. Each node may receive the public profiles associated with one, some or all of the other nodes.

Figure 2B:
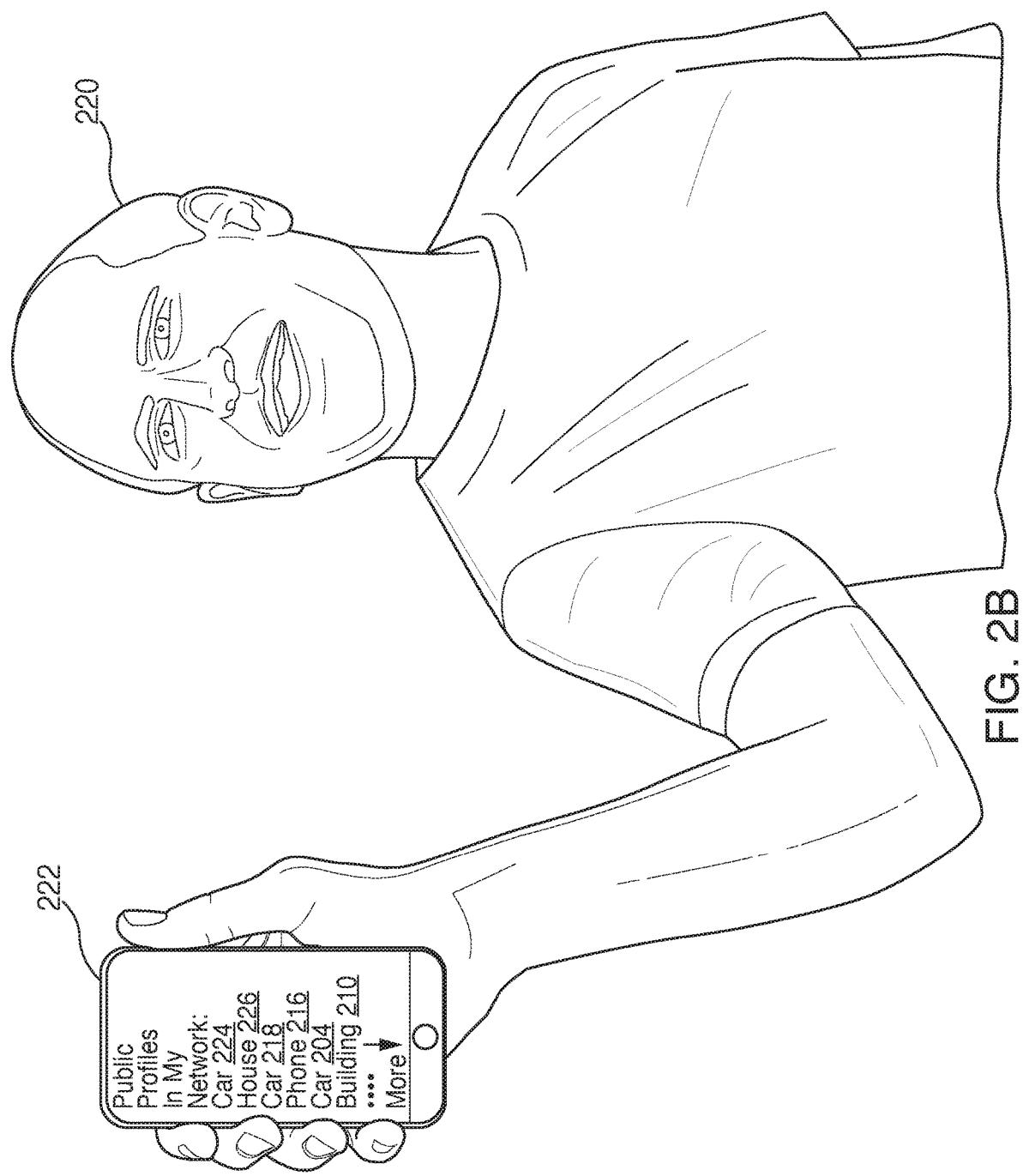

FIG. 2B shows a close-up view of person 220 and mobile device 222. It should be appreciated that each of the public profiles shown in FIG. 2A are stored on mobile device 222.

In the event of an outage, each node included in the network may be able to identify the most-recently communicated public profile of the node experiencing the outage.

Figure 3:
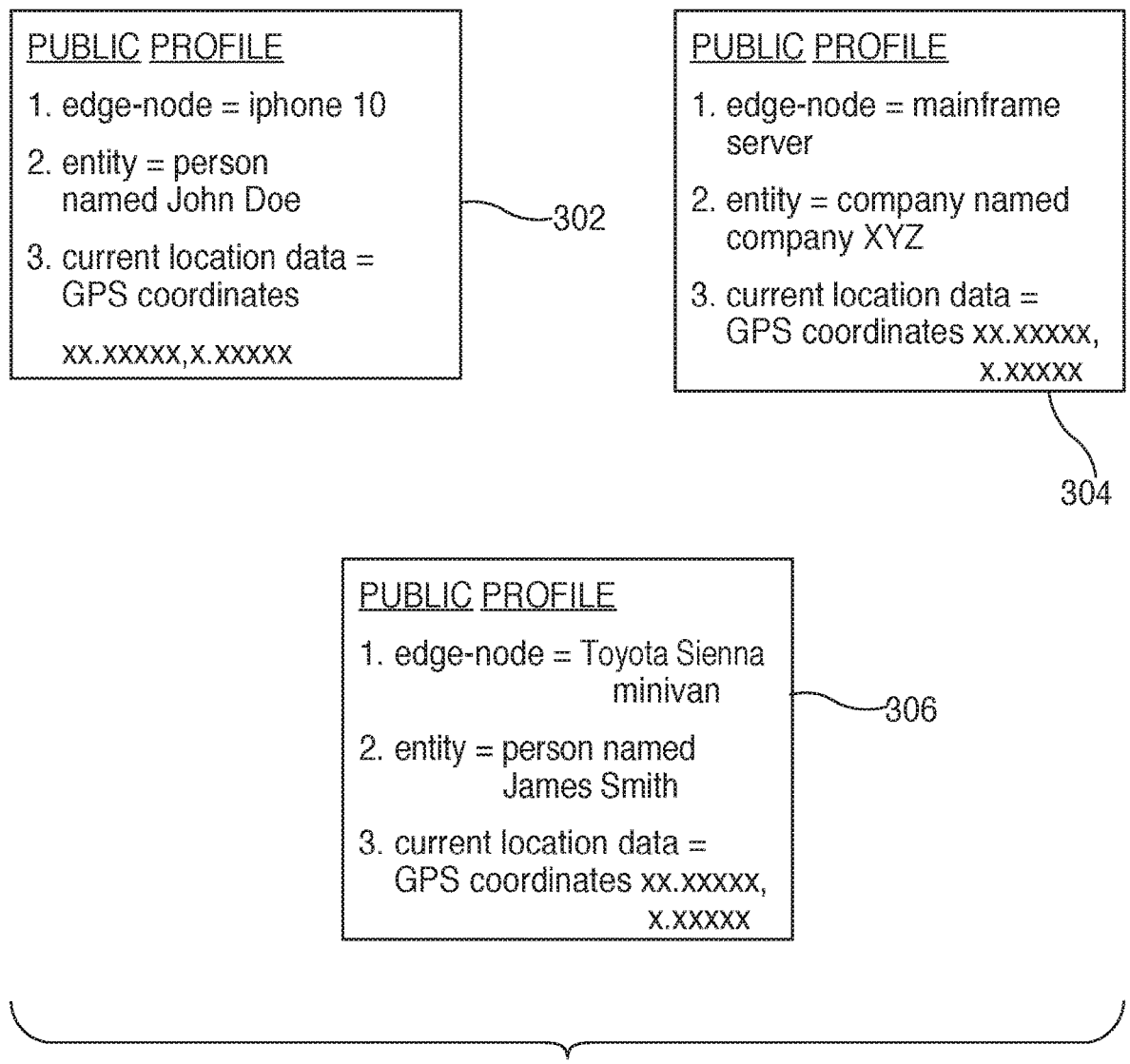
FIG. 3 shows another illustrative diagram in accordance with principles of the invention.

FIG. 3 shows exemplary public profiles 302, 304 and 306. Each public profile may identify a different node in a network.

Public profile 302 may be a profile of a mobile device. Public profile 302 may include the model of the mobile device (iPhone® 10). Public profile 302 may include an entity associated with the mobile device (a person named John Doe). Public profile 302 may also include GPS coordinates for the mobile device.

Public profile 304 may be a profile of a mainframe server. Public profile 3043 may include an entity associated with the mainframe server (Company XYZ). Public profile 304 may also include GPS coordinates for the mainframe server. It should be appreciated that, in the event that the mainframe server is stationary, the GPS coordinates may be static.

Public profile 306 may be a profile of a vehicle. Public profile 306 may include the model of the vehicle (Toyota Sienna® minivan). Public profile 306 may include an entity associated with the vehicle (a person named James Smith). Public profile 306 may include GPS coordinates of the vehicle.

Figure 4:
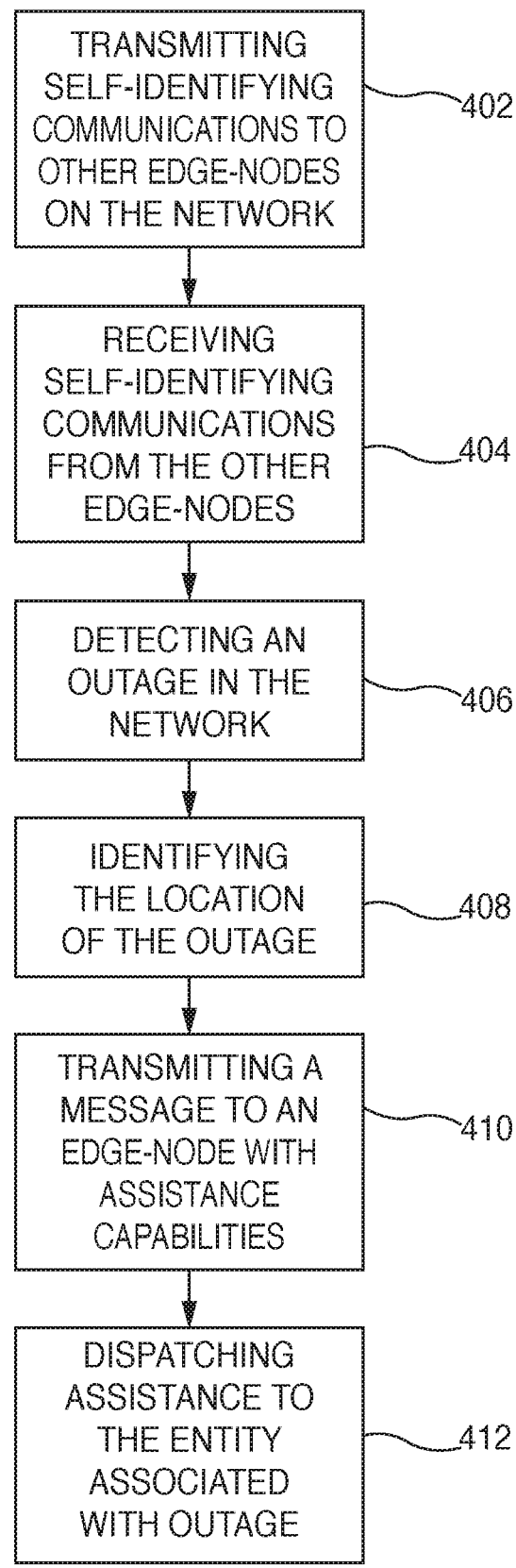
FIG. 4 shows an illustrative flow chart in accordance with principles of the invention.

FIG. 4 shows an illustrative flow chart. Step 402 shows transmitting self-identifying communications to other edge-nodes on a network. Step 404 shows receiving self-identifying communications from other edge-nodes on the network.

Step 406 shows detecting an outage in the network. The outage may include one edge-node. The outage may include a plurality of edge-nodes. The edge-node or noes incurring the outage may be associated or co-located with an entity. The outage may be detected by other edge-nodes in the network. Step 408 shows identifying the location of the outage. The outage may be identified by a variety of methods, such as unresponsiveness of an edge-node, transmission of a distress signal from an edge-node or any other suitable method.

Step 410 shows transmitting a message to an edge-node with assistance capabilities. The message may include details of the outage.

Step 412 shows dispatching assistance to the entity associated with the outage. There may be a plurality of entities associated with the outage. The assistance may be dispatched by the edge-node with assistance capabilities.

Thus, an edge computing system for aggregating outage data is provided. Persons skilled in the art will appreciate that the present invention can be practiced by other than the described embodiments, which are presented for purposes of illustration rather than of limitation. The present invention is limited only by the claims that follow.

What is claimed is:

1. An edge computing system for aggregating outage data before, during or after an outage, the system comprising:
    an edge-node computing network, said edge-node computing network comprising a plurality of edge-nodes, each edge-node comprising:
        a public profile, said public profile comprising: identification data relating to an entity co-located with the edge-node, said entity consisting of a person, vehicle or building; and a real-time location of the edge-node;
        a communication module, said communication module for communicating a self-identifying, self-locating, communication to the other edge-nodes included in the network, the self-identifying, self-locating, communication comprising the public profile; wherein:

the communication module communicates the public profile on a predetermined schedule to the other edge-nodes in the network;

when a first edge-node, included in the public profile, undergoes an outage, the other edge-nodes:
  detect the outage of the first edge-node based on the non-responsiveness of the first edge-node;
  identify a stored, most-recent, real-time, location of the first edge-node based on a most-recently received public profile from the first edge-node;

upon identification of the stored, most-recent, real-time location of the first edge-node, the other edge-nodes transmit an outage message to a second edge-node included in the network, said second edge-node configured to provide outage-restoration-assistance, said outage message comprising the stored, most-recent, real-time location;

upon receipt of a plurality of outage messages at the second edge-node, the second edge-node:
  combines multiple instances of a single outage included in the plurality of outages;
  removes a subset of outages from the plurality of outages, wherein each outage included in the subset of outages were incorrectly identified as outages; and
  aggregates the plurality of outage messages, and dispatches outage-restoration-assistance to the entity associated with the first edge-node, said outage-restoration-assistance comprising three tiers:
    a first outage-restoration-assistance tier, said first outage-restoration-assistance tier configured to generate an instruction to transmit a self-healing workload to the first edge-node;
    a second outage-restoration-assistance tier, said second outage-restoration-assistance tier configured to generate an instruction to transmit a universal serial bus ("USB") drive comprising a repair script to the first edge node, said second outage-restoration-assistance tier initiated in response to a failure at the first outage-restoration-assistance tier; and
    a third outage-restoration-assistance tier, said third outage-restoration-assistance tier configured to generate an instruction to transmit a first responder to the first edge-node, said third outage-restoration-assistance tier initiated in response to a failure at the second outage-restoration-assistance tier; and the edge-nodes, included in the network, communicate through LORA wide area network ("WAN") connections.

2. The edge computing system of claim 1, wherein the edge-nodes included in the network are located in different locations.

3. The edge computing system of claim 2, wherein each edge-node, included in the network, is a distance from each of the remaining edge-nodes in the network, and each distance is between one hundred feet and five hundred feet.

4. The edge computing system of claim 1, wherein, when two or more edge-nodes comprise a public profile that identifies the same entity, and the current location of the two or more edge-nodes is within a predetermined distance, the two or more edge-nodes are identified as a single joint edge-node.

5. The edge computing system of claim 4, wherein the predetermined distance is between fifty feet and five hundred feet.

6. The edge computing system of claim 1, wherein the plurality of outage messages is transmitted from the other edge-nodes to the second edge-node via one or more edge-nodes.

7. The edge computing system of claim 1, wherein the plurality of outage messages further comprises the public profile of the first edge-node.

8. The edge computing system of claim 1, wherein the outage is a natural disaster.

9. A method for aggregating outage data via an edge computing system, the method comprising:
  transmitting, on a predetermined schedule, by each edge-node included in a network, a self-identifying, self-locating, communication to other edge-nodes included in the network, the self-identifying, self-locating, communication comprising a public profile, said public profile comprising identification data relating to an entity co-located with the edge-node and a real-time location of the edge-node;
  receiving, at each edge-node included in the network, self-identifying, self-locating, communications from the other edge-nodes in the network, the self-identifying, self-locating, communications comprising a public profile;
  detecting, by other edge-nodes included in the network, an outage relating to a first edge-node included in the network, said detecting being based on non-responsiveness of the first edge-node;
  identifying, by the other edge-nodes included in the network, based on the most-recently communicated public profile of the first edge-node, the most-recent, real-time, location of the entity co-located with the first edge-node;
  transmitting, by the other edge-nodes, an outage message, to an authoritative aggregator agent, said outage message comprising the identified most-recent, real-time, location of the entity co-located with the first edge node;
  aggregating, at the authoritative aggregator agent, a plurality of outage messages, said plurality of outage messages comprising the outage message;
  organizing, at the authoritative aggregator agent, the plurality of outage messages into a heat map of outages, said organizing comprising:
    combining multiple instances of a single outage included in the plurality of outages;
    removing a subset of outages from the plurality of outages, wherein each outage included in the subset of outages were incorrectly identified as outages;
    identifying a priority for each outage included in the plurality of outages;
    arranging the priority of the plurality of outages; and
    generating the heat map of outages, said heat map of outages displaying the plurality of outages and the priority of each of the plurality of outages;
  transmitting, by the authoritative aggregator agent, the heat map of outages to a second edge-node, the second edge-node configured to provide outage-restoration-assistance to the plurality of outages displayed on the heat map; and
  dispatching, from the second edge-node, outage-restoration-assistance to the identified locations displayed on the heat map; and wherein the edge-nodes, included in the network, communicate through LORA wide area network ("WAN") connections.

10. The method of claim 9, wherein the edge-nodes included in the network are located in different locations.

11. The method of claim 10, wherein each edge-node included in the network is a distance from each other edge-node included in the network, and each distance is between one hundred feet and five hundred feet.

12. The method of claim 9, wherein, when two or more edge-nodes comprise a public profile that identifies the same entity, and the current location is within a predetermined distance, the two or more edge-nodes may be identified as a single joint edge-node.

13. The method of claim 12, wherein the predetermined distance is between fifty feet and five hundred feet.

14. The method of claim 9, wherein the outage message is transmitted from the other edge-nodes to the second edge-node via one or more edge-nodes.

15. The method of claim 9, further comprising:
   aggregating a plurality of received outage messages at the second edge-node;
   generating an organized list of received outage messages; and
   presenting the organized list of received outage messages to an entity associated with the second edge-node.

16. The method of claim 15, wherein the entity associated with the second edge-node is a first responder.

17. The method of claim 9, wherein the outage is a natural disaster.

* * * * *